United States Patent [19]
Miyano

[11] Patent Number: 6,068,320
[45] Date of Patent: May 30, 2000

[54] VEHICULAR PILLAR COVER

[75] Inventor: Atsushi Miyano, Takatsuki, Japan

[73] Assignee: Kaneka Corporation, Osaka, Japan

[21] Appl. No.: 09/179,884

[22] Filed: Oct. 28, 1998

[30] Foreign Application Priority Data

Oct. 30, 1997 [JP] Japan ..................................... 9-316162

[51] Int. Cl.[7] .................................................. B60R 13/01
[52] U.S. Cl. .......................... 296/39.1; 296/189; 280/751
[58] Field of Search .................... 296/39.1, 189, 296/188; 280/751, 752; 293/133, 136; 188/371

[56] References Cited

U.S. PATENT DOCUMENTS

| | | | |
|---|---|---|---|
| 3,843,182 | 10/1974 | Walls et al. | 293/122 |
| 3,871,636 | 3/1975 | Boyle | 267/140 |
| 4,925,224 | 5/1990 | Smiszek | 293/120 |
| 5,660,426 | 8/1997 | Sugimori et al. | 296/189 |
| 5,795,013 | 8/1998 | Keller et al. | 296/188 |
| 5,938,273 | 8/1999 | Williams et al. | 296/189 |
| 5,992,914 | 11/1999 | Gotoh et al. | 296/39.1 |

FOREIGN PATENT DOCUMENTS 406072153  3/1994  Japan .................... 296/189

*Primary Examiner*—D. Glenn Dayoan
*Assistant Examiner*—Paul Chenevert
*Attorney, Agent, or Firm*—Armstrong, Westerman, Hattori, McLeland & Naughton

[57] ABSTRACT

A vehicular pillar cover which is drastically improved in a performance for absorbing and damping an impact. The vehicular pillar cover comprises ribs (3a and 3b) staggered in a body (2) having a generally C-shaped or folded section, at a suitable spacing, and so extended generally at a right angle with respect to the longitudinal direction of the body (2) from the individual side wall portions (2a and 2b) of the body (2) as to form gaps between the opposed side wall portions and cut-off portions (4a and 4b) in the upper faces of the ribs (3a and 3b) and along the inner side shape of the body (2).

17 Claims, 9 Drawing Sheets

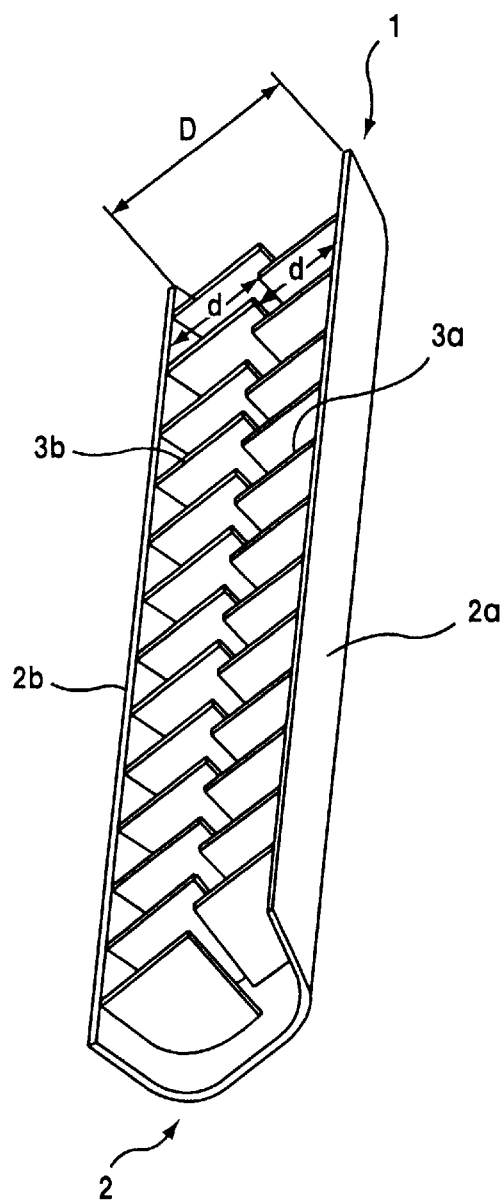
Fig.2
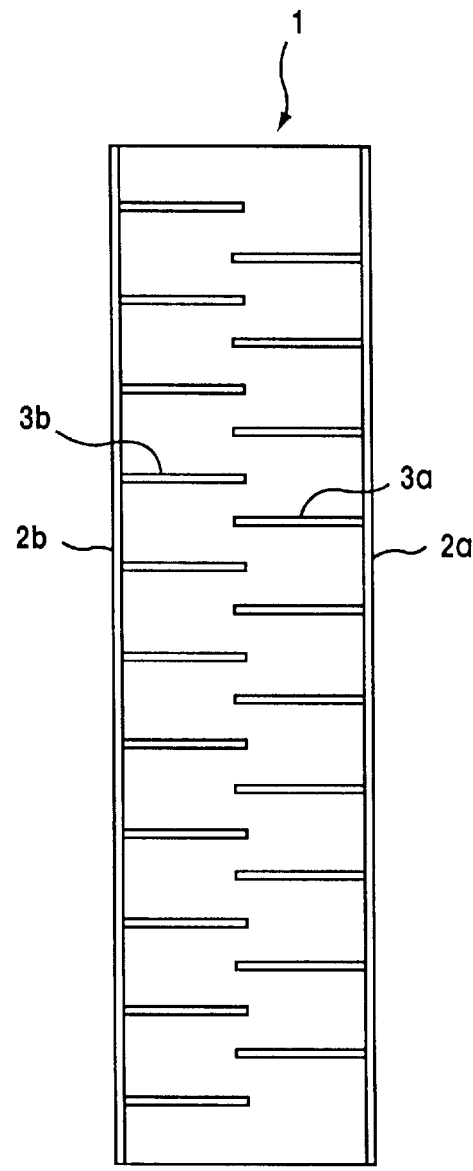
Fig.2a
Fig.2b

Fig.2d
Fig.2c
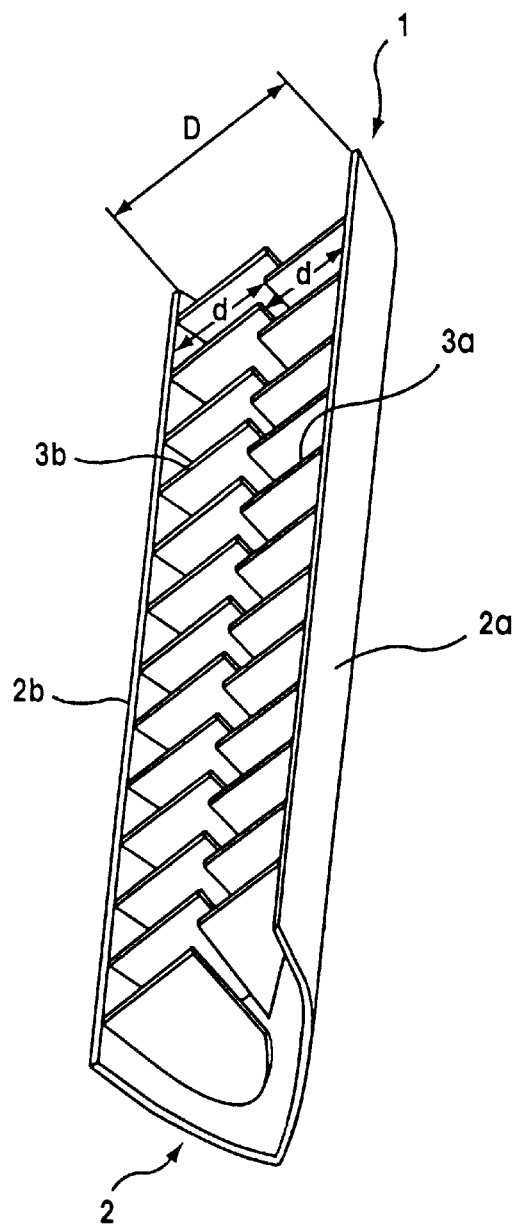
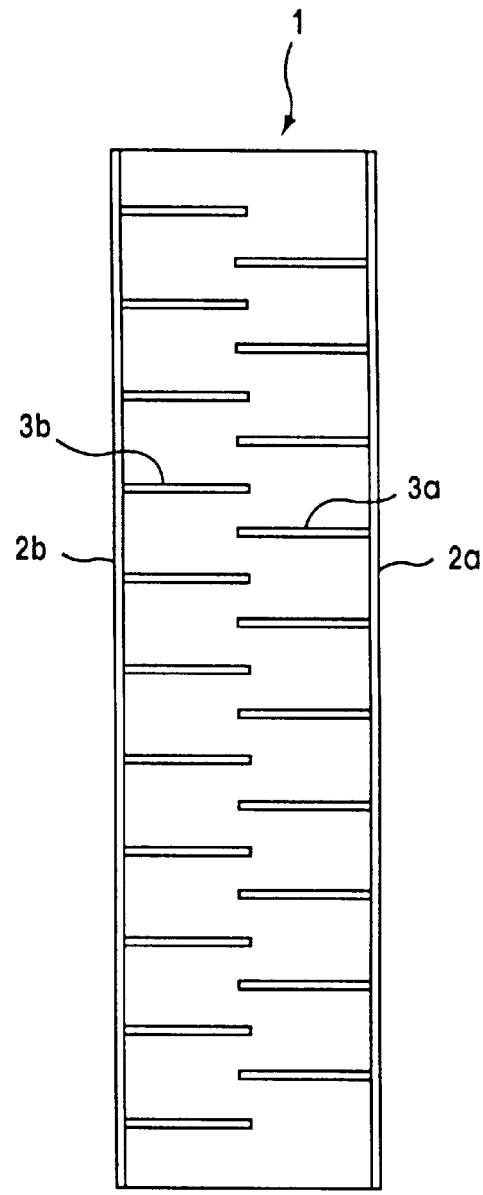
Fig.2e
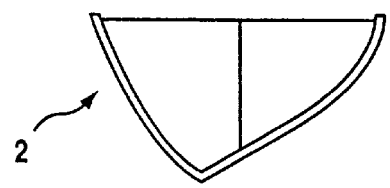

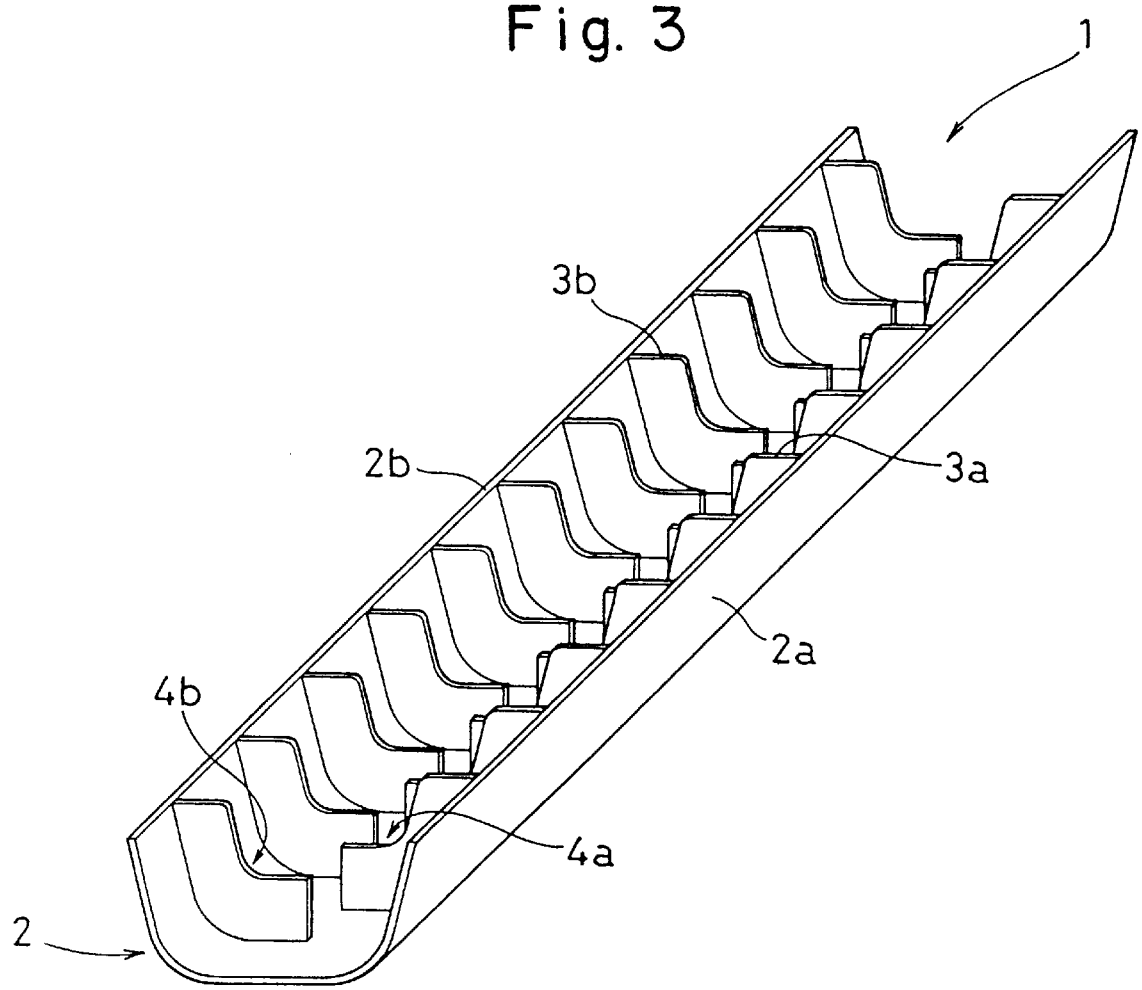

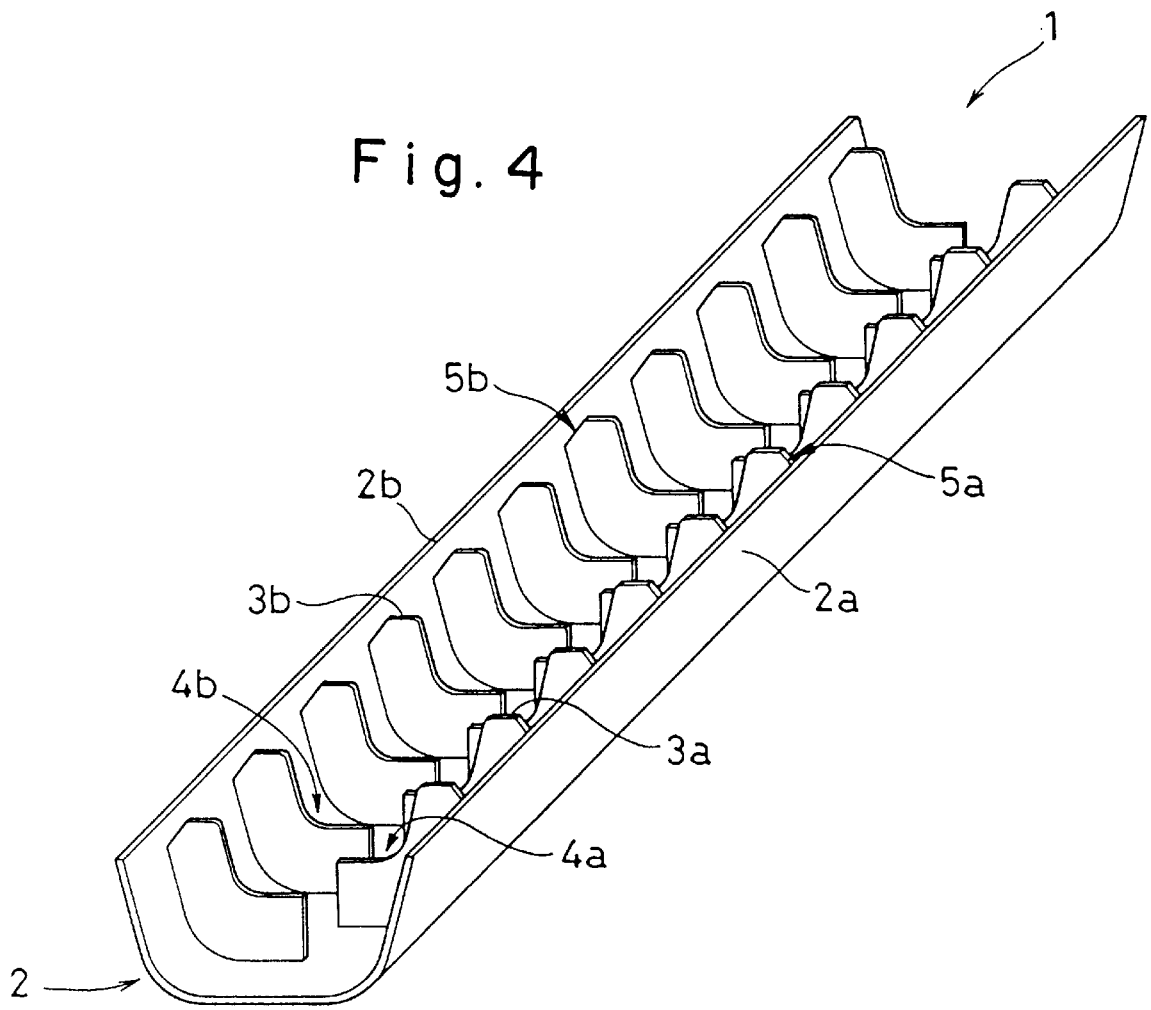

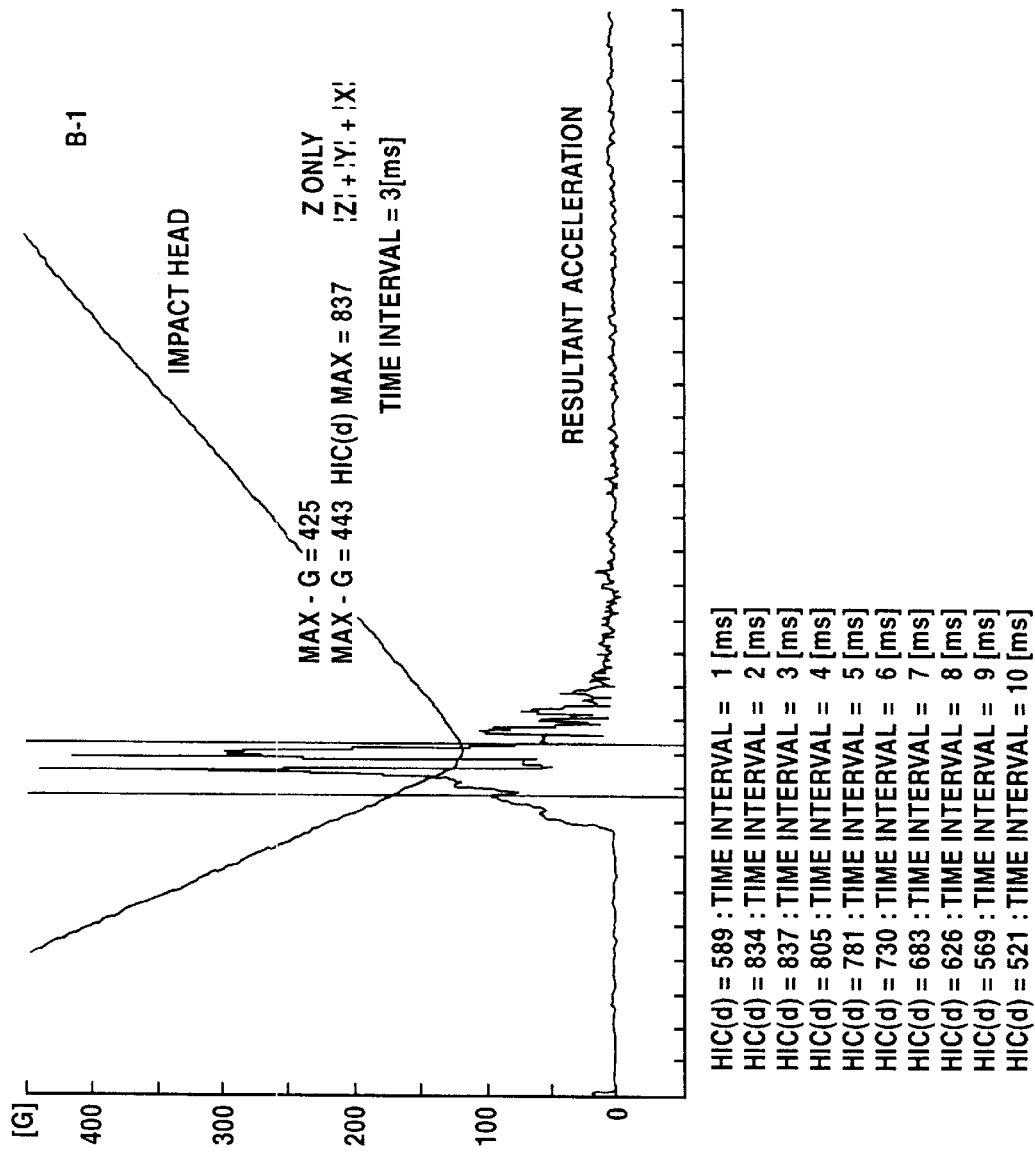

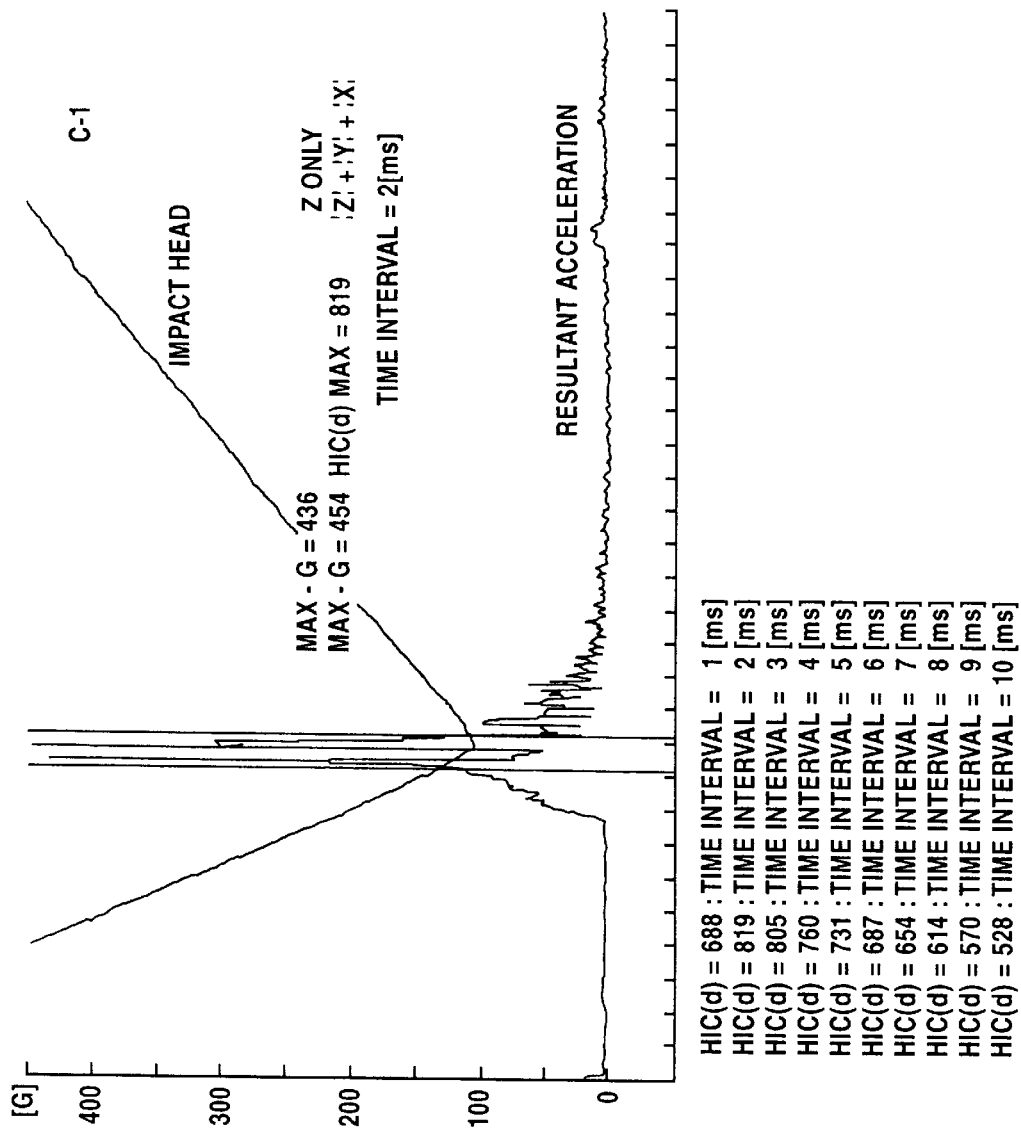

VEHICULAR PILLAR COVER

BACKGROUND OF THE INVENTION

1. Field of the Invention

The present invention relates to a vehicular pillar cover and, more particularly, to a vehicular pillar cover which is drastically improved in a performance for absorbing and damping an impact.

2. Description of Related Art

The vehicular pillar cover is constructed to keep the beauty of the inside of a vehicular compartment and to absorb and damp such an impact by an elastic deformation as might otherwise be received a portion (e.g., head) of the body of a passenger from the vehicular body when the vehicle makes a collision, for example.

As shown in FIG. 7, a vehicular pillar cover 11 of the prior art is equipped, in a body 12 having a generally C-shaped section, with a longitudinal rib 13 extending longitudinally of the general center and a plurality of transverse ribs 14 intersecting the longitudinal rib 13 generally at a right angle and integrally jointed to the side wall portions 12a and 12b of the body 12.

In the vehicular pillar cover thus constructed, however, the longitudinal rib 13 and the transverse ribs 14 intersect, and the transverse ribs 14 are integrally jointed to the side wall portions of the body 12. As a result, the vehicular pillar cover will hardly elastically deform, even when it receives an impact, so that its ability to absorb and damp the impact is limited of itself. For example, the head injury code HIC (d), as specified in Federal Motor Vehicle Safety Standard (USA) FMVSS 201, cannot be reduced to less than 1,000.

SUMMARY OF THE INVENTION

In view of the background thus far described, the invention has an invention to provide a vehicular pillar cover which is enabled to highly deform in an elastic manner by eliminating the intersection of ribs and to have a high impact absorbing and damping ability and an HIC(d) value no more than 1,000.

In order to achieve this object, according to the invention, there is provided a vehicular pillar cover comprising a plurality of ribs arranged in a body having a generally C-shaped or folded section, at a suitable spacing in the longitudinal direction of the body, and extended generally at a right angle with respect to the longitudinal direction of the body from the individual side wall portions of the body toward the opposed side wall portions while being opened at their leading ends.

In this vehicular pillar cover, the individual ribs neither intersect nor are jointed to the two side wall portions of the walls but are opened at their leading end portions to leave the gaps either between the opposed ribs or between the ribs and the side wall portions on one side. As a result, the elastic deformation is enlarged when the vehicular pillar cover receives an impact. At the time of an impact, more specifically, the vehicular pillar cover easily reduces its sectional area and buckles to reduce the buckling load so that a vehicular pillar cover having a small HIC(d) value (as small as 1,000 or less) and a high safety can be achieved.

Here, the two ribs individually extending from the individual side wall portions of the body are preferably paired and linearly opposed to each other through a gap between their leading end portions.

Here, the gap is preferably as wide as one fifth to four fifths of the spacing distance between the upper edges of the individual side wall portions.

Moreover, the ribs are so staggered and extended from the individual side wall portions at a suitable spacing in the longitudinal direction of the body that their leading ends, as individually extended from the individual side wall portions of the body, are opposed through a spacing distance to the side wall portions on the opposite sides. Then, the elastic deformation by the impact can be more facilitated to provide a high impact damping ability.

Here, the gap is as wide as one fifth to four fifths of the spacing distance between the upper edges of the individual side wall portions.

Cut-off portions are formed in the upper faces of the ribs to follow the inner side shape of the body. Then, the vehicular pillar cover is assembled more compact in its entirety by arranging a frame therein. Since the distance between the frame and the body is constant, moreover, the impact damping ability can be homogenized all over the surface of the vehicular pillar cover.

Moreover, notches are formed in the upper faces of the ribs in the vicinity of the joints to the side wall portions. Then, the elastic deformation to the impact to act directly on the individual ribs can be facilitated to provide a higher impact damping ability.

BRIEF DESCRIPTION OF THE DRAWINGS

FIG. 2 is a perspective view showing a vehicular pillar cover according to Embodiment 2 of the invention;

FIG. 2a is a top-down view of the vehicular pillar cover of FIG. 2;

FIG. 2b is a cross sectional view of the vehicular pillar cover of FIG. 2;

FIG. 2c is a perspective view showing a vehicular pillar cover according to the present invention having a folded section;

FIG. 2d is a top-down view of the vehicular pillar cover of FIG. 2c;

FIG. 2e is a cross sectional view of the vehicular pillar cover of FIG. 2c;

FIG. 3 is a perspective view showing a vehicular pillar cover according to Embodiment 3 of the invention;

FIG. 4 is a perspective view showing a vehicular pillar cover according to Embodiment 4 of the invention;

FIG. 5 is a chart plotting an HIC (d) value of the vehicular pillar cover of Embodiment 3;

FIG. 6 is a chart plotting an HIC (d) value of the vehicular pillar cover of Embodiment 4;

DESCRIPTION OF THE PREFERRED EMBODIMENTS

A vehicular pillar cover of the invention is employed as a front pillar cover, a center pillar cover or a rear pillar cover and is preferably molded of a thermoplastic resin. This thermoplastic resin may be exemplified, although not limitative, by polypropylene, polystyrene, polyvinyl chloride, acryl resin, polyamide, polyester, polycarbonate or ABS resin, of which the polypropylene and the ABS resin are preferred. On the other hand, the molding process is preferably exemplified by the injection molding process.

[EMBODIMENTS]

With reference to the accompanying drawings, the invention will be described in connection with its embodiments, but it is quite natural that the invention should not be limited to the embodiments.

(Embodiment 1)

Figure 1:
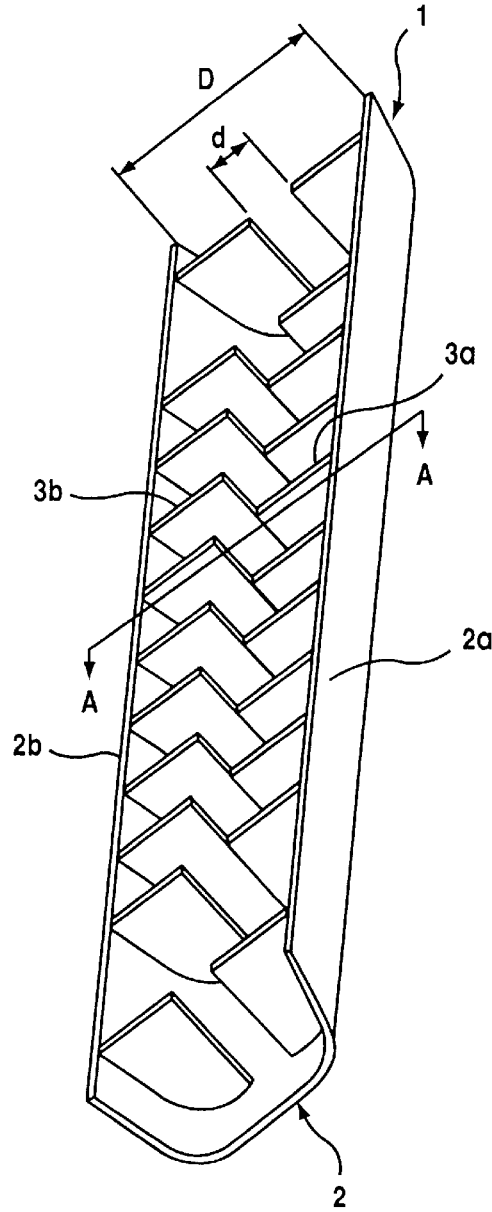
FIG. 1 is a perspective view showing a vehicular pillar cover according to Embodiment 1 of the invention.
Figure 1A:
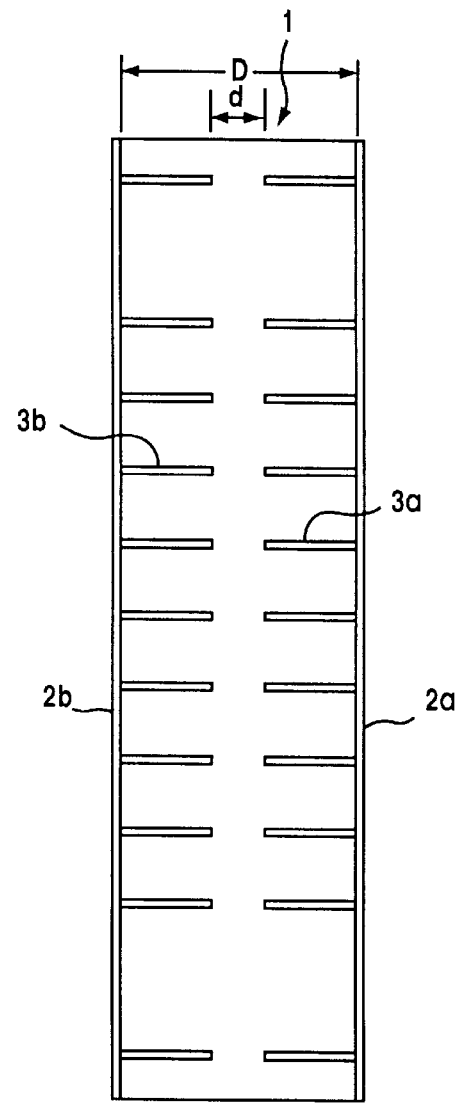
FIG. 1a is a top-down view of the vehicular pillar cover of FIG. 1.
Figure 1B:
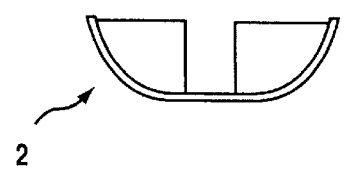
FIG. 1b is a cross sectional view taken along line A—A of the vehicular pillar cover of FIG. 1.

FIG. 1 is a perspective view showing a vehicular pillar cover according to Embodiment 1 of the invention.

A vehicular pillar cover 1 is constructed to include a plurality of pairs of ribs 3a and 3b which are arranged in a body 2 having a generally C-shaped section, at a suitable spacing in the longitudinal direction of the body 2. The paired ribs 3a and 3b are extended generally at a right angle with respect to the longitudinal direction of the body from the individual side wall portions 2a and 2b of the body 2 toward the opposed side wall portions 2a and 2b. The ribs 3a and 3b are linearly opposed at their leading ends to each other through a gap d.

The vehicular pillar cover 1 may have a size suitably selected according to the size of the vehicle. Usually, the body 2 has a width of about 50 to 120 mm, a length of about 600 to 1,300 mm depending on the portion of the pillar and the size of the vehicle, a height of about 15 to 70 mm and a thickness of about 1.5 to 4.5 mm. On the other hand, the ribs 3a and 3b have a thickness of about 1 to 1.8 mm. The spacing between the adjoining ribs 3a or 3b is about 10 to 35 mm. However, this rib spacing need not always be equal, but the ribs at difference spacings may be regularly or irregularly mixed or may be random. Moreover, the sizes of the ribs 3a and 3b need not always be equal but may be partially different in the ribs 3a or in the ribs 3b or may be different between the ribs 3a and the ribs 3b.

Moreover, the gap d between the opposed ribs 3a and 3b is preferred to be about one fifth to four fifth of a spacing distance D between the upper edge of the side wall portion 2a and the upper edge of the side wall portion 2b. The elastic deformation at the time of an impact is so small that a sufficient impact damping is hard to achieve, if the gap d is excessively small. If the gap d is excessively large, on the other hand, the contact area between the body and the ribs 3a and 3b is so small as to raise a tendency for the strength to become insufficient.

In the vehicular pillar cover thus constructed, unlike the prior art, the individual ribs neither intersect nor are jointed to the two side wall portions but are opened at their opposed leading end portions to leave the gaps. At the time of an impact, therefore, the vehicular pillar cover is elastically deformed (or reduced in the sectional area of the body) to reduce the buckling load of the ribs so that an HIC (d) value of no more than 1,000 can be easily achieved.

(Embodiment 2)

FIG. 2 is a perspective view showing a vehicular pillar cover according to Embodiment 2 of the invention.

A vehicular pillar cover 1 is constructed to include a plurality of pairs of ribs 3a and 3b which are staggered in a body 2 having a generally C-shaped section, at a suitable spacing in the longitudinal direction of the body 2. The paired ribs 3a and 3b are extended generally at a right angle with respect to the longitudinal direction of the body from the individual side wall portions 2a and 2b of the body 2 toward the opposed side wall portions 2a and 2b. The ribs 3a and 3b are opposed at their leading ends to the side wall portions 2a and 2b through a gap d.

The sections of the size of the vehicular pillar cover 1 and the size and (equally or differently distant, regular, irregular or random) array of the ribs 3a and 3b are similar to those of the foregoing Embodiment 1, and the gap d between the leading ends of the ribs 3a and 3b and the opposed side wall portions 2b and 2a is preferred to be about one fifth to four fifths of the spacing distance D between the upper edge of the side wall portion 2a and the upper edge of the side wall portion 2b. This is, as in Embodiment 1, because the elastic deformation at the time of an impact is so small for the excessively small gap d that a sufficient impact damping is hard to achieve and because the contact area between the body and the ribs 3a and 3b is so small for the excessively large gap d as to raise a tendency for the strength to become insufficient.

In the vehicular pillar cover 1 of this embodiment, as in the aforementioned vehicular pillar cover of Embodiment 1, the individual ribs neither intersect nor are jointed to the two side wall portions but are opened at their opposed leading end portions to leave the gaps. At the time of an impact, therefore, the vehicular pillar cover is elastically deformed (or reduced in the sectional area of the body) to reduce the buckling load of the ribs so that an HIC (d) value of no more than 1,000 can be easily achieved.

By staggering the ribs 3a and 3b in this embodiment, the elastic deformation by an impact can be more facilitated than in Embodiment 1 thereby to establish a higher impact damping ability.

(Embodiment 3)

FIG. 3 is a perspective view showing a vehicular pillar cover according to Embodiment 3 of the invention. The vehicular pillar cover 1 of Embodiment 2 (of FIG. 2) is modified such that the upper faces of the ribs 3a and 3b are removed to form cut-off portions 4a and 4b which are generally shaped to follow the inner side shape of the body 2. The remaining construction is similar to that of Embodiment 1.

With these cut-off portions 4a and 4b, as in this embodiment, the vehicular pillar cover 1 is assembled more compact by arranging a frame therein. Since the distance between the frame and the body 2 through the ribs 3a and 3b is constant, moreover, the impact damping ability is homogenized all over the surface of the vehicular pillar cover 1. The remaining effects are similar to those of Embodiment 2.

(Embodiment 4)

FIG. 4 is a perspective view showing a vehicular pillar cover according to Embodiment 4 of the invention. The vehicular pillar cover of Embodiment 3 (of FIG. 3) is modified such that notches 5a and 5b are formed in the ribs 3a and 3b in the vicinity of the side wall portions 2a and 2b. The remaining construction is similar to that of Embodiment 3.

With these notches 5a and 5b, as in this embodiment, the elastic deformation can be further facilitated against an impact to be applied just over the ribs, thereby to establish a higher impact damping ability. The remaining effects are similar to those of Embodiment 3.

Figure 7:
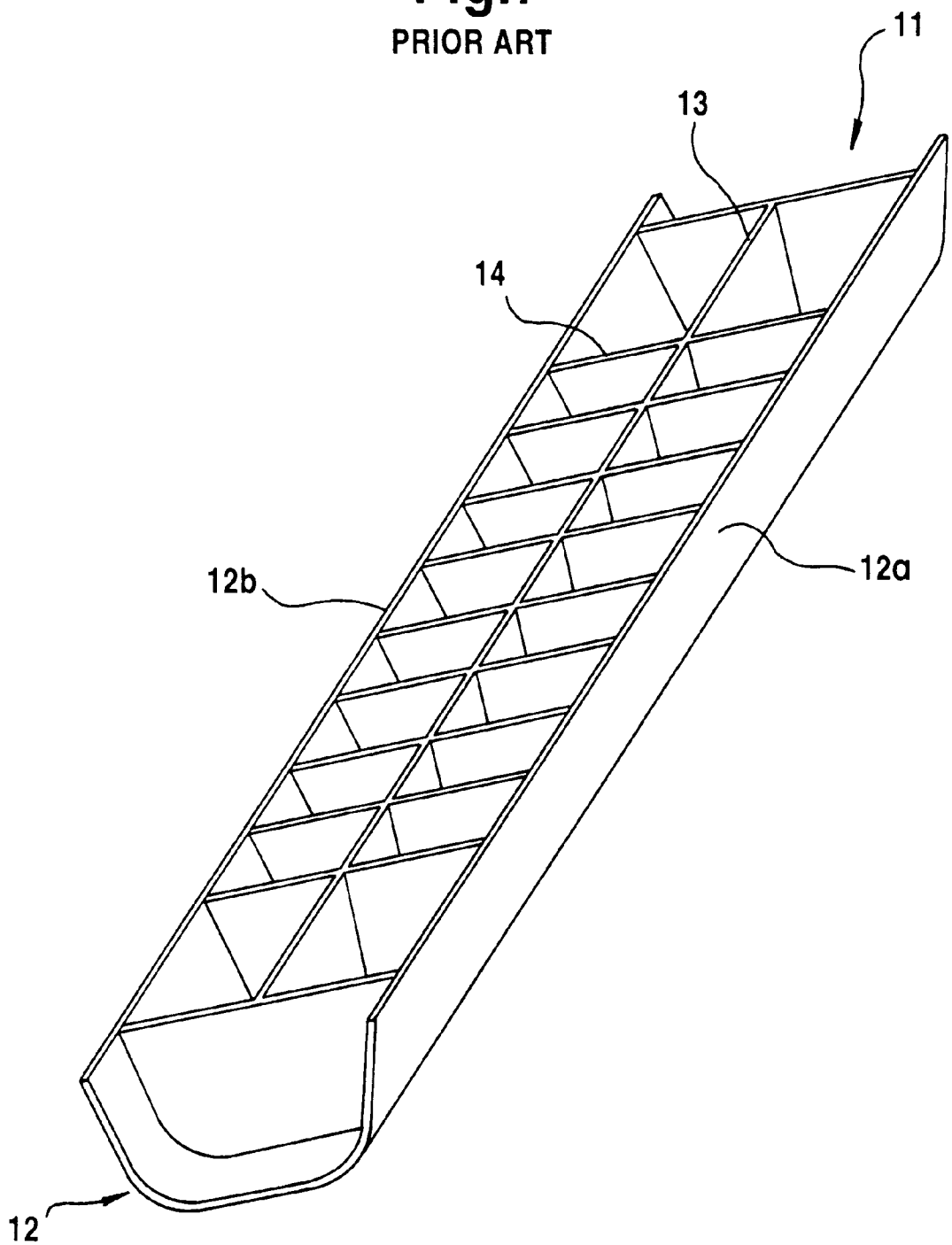
FIG. 7 is a perspective view showing a vehicular pillar cover of the prior art.
Figure 8:
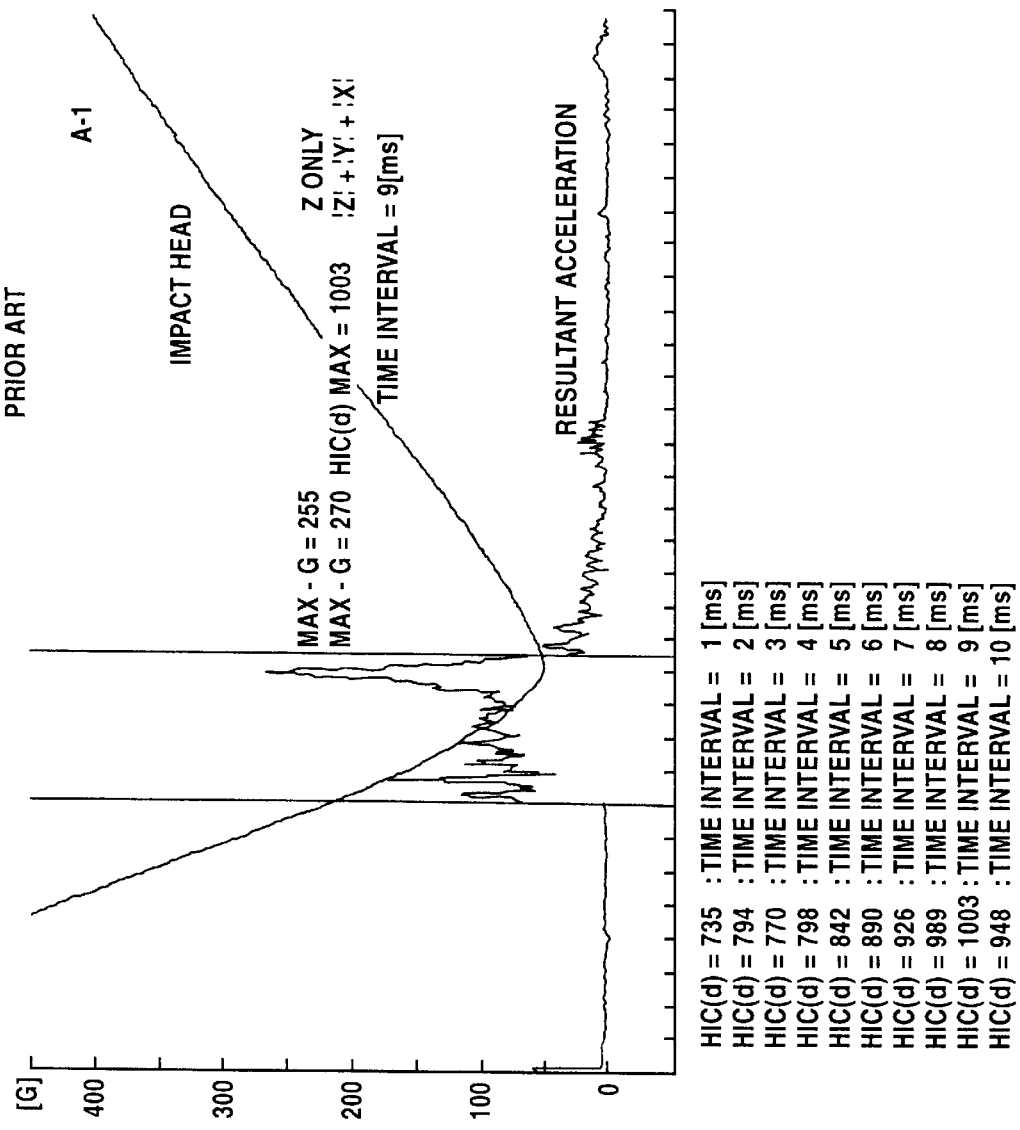
FIG. 8 is a chart plotting an HIC (d) value of the vehicular pillar cover of the prior art.

Next, the results of the HIC (d) values, as estimated on the vehicular pillar covers of FIG. 3 (Embodiment 3), FIG. 4 (Embodiment 4) and FIG. 7 (Prior Art), are plotted in FIG. 5, FIG. 6 and FIG. 8.

Here, the HIC (d) values were calculated by the following Formulas.

$$a = \text{resultant acceleration } (g's) \quad \text{HIC} = [(t_2-t_1)^{-1}\int_{t_1}^{t_2} a\,dt]^{2.5}(t_2-t_1) \quad (1)$$

t1, t2: two instants at collisions and of an interval of 36 msecs. or less.

$$\text{HIC}(d) = 0.754 \times \text{HIC} + 166.4 \quad (2).$$

The HIC(d) value of the vehicular pillar cover of FIG. 3 (Embodiment 3) was 837, as plotted in FIG. 5, whereas the HIC(d) value of the vehicular pillar cover of FIG. 4 (Embodiment 4) was 819, as plotted in FIG. 6, and both indicated a value no more than 1,000. On the other hand, the HIC(d) value of the vehicular pillar cover of FIG. 7 (Prior Art) was 1,003 which is over 1,000, as plotted in FIG. 8.

Here, the foregoing individual embodiments are all exemplified by the vehicular pillar cover having the generally C-shaped section. However, similar effects could naturally be achieved for a vehicular pillar cover having a folded section.

It is also natural that the vehicular pillar cover of Embodiment 1 could have the cut-off portions and/or the notches.

As has been described hereinbefore, according to the invention, the individual ribs neither intersect nor are jointed to the two side wall portions of the walls but are opened at their leading end portions to leave the gaps either between the opposed ribs or between the ribs and the side wall portions on one side. As a result, the elastic deformation is enlarged when the vehicular pillar cover receives an impact. At the time of an impact, more specifically, the vehicular pillar cover easily reduces its sectional area and buckles to reduce the buckling load so that a vehicular pillar cover having a small HIC(d) value (as small as 1,000 or less) and a high safety can be provided.

What is claimed is:

1. A vehicular pillar cover consisting of:
   a generally C-shaped body, said body having a pair of opposing side wall portions with edges at the upper part of said opposing side wall portions; and
   a plurality of ribs arranged inside said body at a suitable spacing in the longitudinal direction of said body, said plurality of ribs extending generally at a right angle with respect to the longitudinal direction of said body and each of said plurality of ribs extending from one opposing side wall portion of said body toward the other opposing side wall portion of said body without attachment to the other opposing side wall portion or a rib extending therefrom and with a gap between the other opposing side wall portion or a rib extending therefrom.

2. The vehicular pillar cover according to claim 1, wherein each of said plurality of ribs extends from one opposing side wall portion toward another rib on the other opposing side wall portion of the body such that each of said plurality of ribs is linearly opposed to another rib and a gap exists between said linearly opposed ribs.

3. The vehicular pillar cover according to claim 2, wherein said gap is as wide as one fifth to four fifths of the width between said edges at the upper part of said opposing side wall portions.

4. The vehicular pillar cover according to any one of claims 1 or 2, wherein each of said plurality of ribs has a plurality of sides with a face surface therebetween, with at least one side associated with said body and at least two other sides independent of attachment, and
   said face surface is shaped to define a generally C-shaped surface.

5. The vehicular pillar cover according to any one of claims 1 or 2, wherein a notch is formed on a face surface of each of said plurality of ribs at a location on the face surface approximate to the side wall portion of said body from which each of said plurality of ribs extends.

6. The vehicular pillar cover according to claim 1, wherein said vehicular pillar cover has an HIC(d) value of 1,000 or less.

7. A vehicular pillar cover consisting of:
   a generally C-shaped body, said body having opposing side wall portions with edges at the upper part of said opposing side wall portions;
   a plurality of ribs having a face surface and arranged on said opposing side wall portions of said body at a suitable spacing in the longitudinal direction of said body, said plurality of ribs extending generally at a right angle with respect to the longitudinal direction of said body, said plurality of ribs being staggered and each of said plurality of ribs extending from one opposing side wall portion of said body toward the other opposing side wall portion of said body so that there exists a gap between each of said plurality of ribs and said other opposing side wall portion.

8. The vehicular pillar cover according to claim 7, wherein said gap is as wide as one fifth to four fifths of the width between said edges at the upper part of said opposing side wall portions.

9. The vehicular pillar cover according to any one of claims 7 or 8, wherein each of said plurality of ribs has a plurality of sides with the face surface therebetween, with at least one side associated with said body and at least two other sides independent of attachment, and
   said face surface is shaped to define a generally C-shaped surface.

10. The vehicular pillar cover according to any one of claims 7 or 8, wherein a notch is formed on said face surface of each of said plurality of ribs at a location on said face surface approximate to the side wall portion of said body from which each of said plurality of ribs extends.

11. The vehicular pillar cover according to claim 7, wherein said vehicular pillar cover has an HIC(d) value of 1,000 or less.

12. A vehicular pillar cover comprising:
   at least one body selected from the group consisting of a generally C-shape body of or folded section body, said body having a pair of opposing side wall portions with edges at the upper part of said opposing side wall portions;
   a plurality of ribs arranged inside said body at a suitable spacing in the longitudinal direction of said body, said plurality of ribs extending generally at a right angle with respect to the longitudinal direction of said body and each of said plurality of ribs extending from one opposing side wall portions of said body toward the other opposing side wall portion of said body without attachment to the other opposing side wall portion or a rib extending therefrom and with a gap between the other opposing side wall portion or a rib extending therefrom;
   each of said plurality of ribs having a plurality of sides with a face surface therebetween, with at least one side associated with said body and at least two other sides independent of attachment;

said face surface is shaped to define a generally C-shaped surface; and a notch being formed on said face surface of each of said plurality of ribs at a location on said face surface approximate to the side wall portion of said body from which each of said plurality of ribs extends.

13. The vehicular pillar cover according to claim 12, wherein the notch is formed on the face surface of each of said plurality of ribs at a location on the face surface approximate to the side wall portion of said body from which each of said plurality of ribs extends.

14. The vehicular pillar cover according to claim 12, wherein said vehicular pillar cover has an HIC(d) value of 1,000 or less.

15. A vehicular pillar cover comprising:

at least one body selected from the group consisting of a generally C-shape body or folded section body, said body having opposing side wall portions with edges at the upper part of said opposing side wall portions;

a plurality of ribs arranged on said opposing side wall portions of said body at a suitable spacing in the longitudinal direction of said body, said plurality of ribs extending generally at a right angle with respect to the longitudinal direction of said body, said plurality of ribs being staggered and each of said plurality of ribs extending from one opposing side wall portion of said body toward the other opposing side wall portion of said body so that there exists a gap between each of said plurality of ribs and said other opposing side wall portion;

each of said plurality of ribs having a plurality of sides with a face surface therebetween, with at least one side associated with said body and at least two other sides independent of attachment;

said face surface is shaped to define a generally C-shaped surface; and a notch being formed on said face surface of each of said plurality of ribs at a location on said face surface approximate to the side wall portion of said body from which each of said plurality of ribs extends.

16. The vehicular pillar cover according to claim 15, wherein the notch is formed on said face surface of each of said plurality of ribs at a location on said face surface approximate to the side wall portion of said body from which each of said plurality of ribs extends.

17. The vehicular pillar covering according to claim 15, wherein said vehicular pillar cover has an HIC(D) value of 1,000 or less.

* * * * *